(12) United States Patent
Chan

(10) Patent No.: US 12,370,473 B2
(45) Date of Patent: Jul. 29, 2025

(54) RECIPROCATING LAMINATION SPIRAL SOLID-LIQUID SEPARATOR

(71) Applicants: DEWLINK SLUDGE TREATMENT LTD, Shropshire (GB); Kwan Hao Chan, Shropshire (GB)

(72) Inventor: Kwan Hao Chan, Shropshire (GB)

(73) Assignees: DEWLINK SLUDGE TREATMENT LTD, Shropshire (GB); Kwan Hao Chan, Shropshire (GB)

(*) Notice: Subject to any disclaimer, the term of this patent is extended or adjusted under 35 U.S.C. 154(b) by 401 days.

(21) Appl. No.: 17/766,792

(22) PCT Filed: Oct. 11, 2019

(86) PCT No.: PCT/CN2019/110540
§ 371 (c)(1),
(2) Date: Apr. 6, 2022

(87) PCT Pub. No.: WO2021/068183
PCT Pub. Date: Apr. 15, 2021

(65) Prior Publication Data
US 2023/0102465 A1    Mar. 30, 2023

(51) Int. Cl.
*B01D 29/46* (2006.01)
*B01D 29/64* (2006.01)
*B01D 29/82* (2006.01)
*C02F 11/125* (2019.01)

(52) U.S. Cl.
CPC ......... *B01D 29/46* (2013.01); *B01D 29/6476* (2013.01); *B01D 29/828* (2013.01); *C02F 11/125* (2013.01); *B01D 2201/34* (2013.01)

(58) Field of Classification Search
CPC .. B01D 29/46; B01D 29/6476; B01D 29/828; B01D 2201/34; C02F 11/125; B30B 9/16; B30B 9/26
See application file for complete search history.

(56) References Cited

U.S. PATENT DOCUMENTS

2013/0062268 A1* 3/2013 Kaneko ................. B30B 9/12
  210/228

* cited by examiner

*Primary Examiner* — Hayden Brewster
(74) *Attorney, Agent, or Firm* — Li & Cai Intellectual Property (USA) Office

(57) ABSTRACT

A reciprocating lamination spiral solid-liquid separator is provided, including: a support frame, a filter chamber, a spiral shaft and a driving device. The filter chamber is assembled with the support frame. The spiral shaft is mounted on the support frame and passes through the filter chamber. The driving device is mounted on the support frame. Two ends of the filter chamber respectively have a feed port and a discharge channel. The filter chamber includes a first closed movable ring-piece assembly and a second closed ring-piece assembly having a motion state that is inconsistent with that of the first closed movable ring-piece assembly. The first and second closed ring-piece assemblies are stacked alternately to form the filter chamber, and a gasket is disposed between two adjacent closed ring-pieces of one of the closed ring-piece assemblies.

10 Claims, 16 Drawing Sheets

A

RECIPROCATING LAMINATION SPIRAL SOLID-LIQUID SEPARATOR

FIELD OF THE DISCLOSURE

The present disclosure relates to a solid-liquid separation device, and more particularly to a reciprocating lamination spiral solid-liquid separator.

BACKGROUND OF THE DISCLOSURE

The solid-liquid separator is mainly used for sludge dewatering. A conventional lamination spiral sludge dehydrator has a filter chamber formed by stacking fixed rings and movable rings. The fixed rings are fixed on a pillar and remain fixed. The filter chamber relies on the movement of the movable rings to change the overlapping position with the fixed rings to keep the filter seam unobstructed and not blocked. However, the movable rings are driven by the spiral shaft in the filter chamber. Since the movable rings run continuously in contact with the spiral shaft, wear is likely to occur between the spiral shaft and the movable rings. Furthermore, the filter chamber includes only one spiral shaft disposed therein, which is easy to cause plate hardening, and the entangled sludge is easily blocked in the filter chamber, which affects the stable operation of the equipment.

Chinese Patent Application No. 201720385178.1 discloses a multi-axis laminated spiral solid-liquid separator with pendulum motion. The filter chamber of the separator is formed by staggered arrangement of fixed rings and movable rings. The filter chamber includes two or more spiral shafts arranged side by side. Through the drive of the eccentric device at one end of the movable rings and the limit of the guide device at the other end, the movable rings generate displacement and change in the overlapping area with the fixed rings when the movable rings are not in contact with the spiral shafts. Accordingly, the filter gap between the fixed rings and the movable rings can be kept unobstructed. In addition, the technical problems of the sludge that is easy to harden and entangle that is easy blocked in the chamber can be solved. However, in the driving mode of the above structure, the frictional resistance in the limiting hole between the driving end with the eccentric device and the guiding end for limiting will cause deformation of the movable rings during operation. Furthermore, the larger the device, the larger the movable ring pieces, and the larger the hollow span of the ring pieces. The driving end and the guiding end are squeezed towards each other, which can easily cause the deformation or even breakage of the movable ring pieces. In addition, due to the inconsistency of the motion trajectories at both ends. That is, the limiting end performs up and down linear motion, while the guiding moving end performs left and right pendulum motion, resulting in poor permeability of the upper half of the filter chamber, which affects the filtering effect and efficiency. In addition, due to the relative disorder of the motion trajectories, the ring pieces are designed to be irregular and uneven. On one hand, the strength of the ring pieces is affected. On the other hand, the filtering effect and filtering efficiency will also have a certain impact. In addition, since the positioning shaft is to be allowed to freely move linearly in the limiting hole, certain wear will inevitably occur between the positioning shaft and the limiting hole.

Therefore, many aspects need to be improved.

SUMMARY OF THE DISCLOSURE

In response to the above-referenced technical inadequacies, a first object of the present disclosure is to provide a reciprocating lamination spiral solid-liquid separator, which enable movable ring-pieces to have a reciprocating motion of a same circular track in all directions. The movable ring-pieces and adjacent closed ring-pieces are displaced, thereby effectively and stably increasing a degree of relative displacement. Therefore, the smoothness of a filter gap can be ensured, and a filter area of the filter gap can be increased. The present disclosure has the advantages of high filtering efficiency, good filtering effect, uniform driving force distribution, high running stability, and long service life.

In order to achieve the above object, the present disclosure provides a reciprocating lamination spiral solid-liquid separator including: a support frame, a filter chamber, a spiral shaft and a driving device. The filter chamber is assembled with the support frame, the spiral shaft is mounted on the support frame and passes through the filter chamber, the driving device is mounted on the support frame, and two ends of the filter chamber respectively have a feed port and a discharge channel. The filter chamber includes a first movable closed ring-piece assembly and a second closed ring-piece assembly having a motion state that is inconsistent with that of the first movable closed ring-piece assembly. The first and second closed ring-piece assemblies are stacked alternately to form the filter chamber. In the first and second closed ring-piece assemblies, a gasket is disposed between two adjacent closed ring-pieces of a plurality of closed ring-pieces of one of the closed ring-piece assemblies, and a thickness of the gasket is greater than that of any one of the closed ring-pieces of another one of the closed ring-piece assemblies, so that a filter gap is formed between the two adjacent closed ring-pieces. The first movable closed ring-piece assembly is connected into a whole through a first connection mechanism that passes through the plurality of closed ring-pieces of the first movable closed ring-piece assembly. The driving device drives the plurality of closed ring-pieces of the first movable closed ring-piece assembly through a first gearing device to reciprocate a same circular track in all directions, so that a relative displacement occurs between the first movable closed ring-piece assembly, the support frame and the adjacent second closed ring-piece assembly. Accordingly, the filter gap becomes more unobstructed, and a filter area of the filter gap is increased.

Preferably, the first connection mechanism includes at least two first linkage shafts. Each of the first linkage shafts passes through a support frame escaping hole and a first movable closed ring-piece through hole of the first movable closed ring-piece assembly. The first linkage shafts are configured to connect the first movable closed ring-piece assembly into a whole and realize synchronous movement. The first gearing device includes at least two first gearing shafts, a first linkage ring-piece and a first eccentric mechanism. Each of the first gearing shafts is assembled with the driving device and can move synchronously with the driving device. The first linkage ring piece is sleeved on the first gearing shafts and is disposed in balanced between two adjacent movable closed ring-pieces of the first movable closed ring-piece assembly. The first eccentric mechanism is disposed between the first linkage ring-piece and the first gearing shaft, and the first eccentric mechanism is configured to drive all the movable closed ring-pieces of the first movable closed ring-piece assembly to generate a reciprocating motion of the same circular track. The first linkage ring-piece has a first linkage ring-piece through hole, and each of the first linkage shafts passes through the first movable closed ring-piece through hole and the first linkage ring-piece through hole.

Preferably, the first eccentric mechanism includes a first eccentric wheel and a first limit piece. The first eccentric wheel is fixedly mounted on the first gearing shaft and is located in the first linkage ring-piece mounting hole of the first linkage ring-piece. The first eccentric wheel is in contact with an inner wall of the first linkage ring-piece mounting hole through a first bearing. When the first gearing shaft rotates, the first eccentric wheel drives the first linkage ring-piece to generate a reciprocating motion of the same circular track. The first limit piece is fastened to a first mounting ear of the first linkage ring-piece and is located on both sides of the first linkage ring-piece mounting hole, and the first limit piece is configured to limit the first eccentric wheel in the first linkage ring-piece mounting hole.

Preferably, the second closed ring-piece assembly is a closed fixed ring-piece assembly in a static state of motion. Each of a plurality of fixed ring-pieces of the closed fixed ring-piece assembly has two or more fixing holes, and two or more fixed shafts respectively pass through the fixing holes and are used for fixing the closed fixed ring-piece assembly on the support frame.

Preferably, the second closed ring-piece assembly is a second movable closed ring-piece assembly, and the second movable closed ring-piece assembly is connected into a whole by a second connection mechanism that passes through the closed ring-pieces of the second movable closed ring-piece assembly. The driving device drives the closed ring-pieces of the second movable closed ring-piece assembly through a second gearing device to perform a reciprocating motion of the same circular track in all directions, so that a relative displacement occurs between the second movable closed ring-piece assembly, the support frame and the adjacent first movable closed ring-piece assembly. Accordingly the filter gap becomes more unobstructed and the filter area of the filter gap is increased. The second connection mechanism includes at least two second linkage shafts. Each of the second linkage shafts passes through a support frame escaping hole and a second movable closed ring-piece through hole of the second movable closed ring-piece assembly. The at least two second linkage shafts are configured to connect the second movable closed ring-piece assembly into a whole and realize a synchronous movement. The second gearing device includes at least two second gearing shafts, a second linkage ring-piece, and a second eccentric mechanism. The second gearing shafts are assembled with the driving device and are capable of moving synchronously with the driving device. The second linkage ring-piece is sleeved on the second gearing shafts and is disposed in balanced between two adjacent second closed ring-pieces of the second movable closed ring-piece assembly. The second eccentric mechanism is disposed between the second linkage ring-piece and the second gearing shaft, and the second eccentric mechanism is configured to drive all the closed ring-pieces of the second movable closed ring-piece assembly to generate a reciprocating motion of the same circular track. The second gearing shaft is capable of being shared with the first gearing shaft, the second linkage ring-piece has a second linkage ring-piece through hole, and the second linkage shaft passes through the second movable closed ring-piece through hole and the second linkage ring-piece through hole. The second eccentric mechanism includes: a second eccentric wheel and a second limit piece. The second eccentric wheel is fixedly mounted on the second gearing shaft and is located in the second linkage ring-piece mounting hole. The second eccentric wheel is in contact with an inner wall of the second linkage ring-piece mounting hole through a second bearing. When the second gearing shaft rotates, the second eccentric wheel drives the second linkage ring-piece to generate a reciprocating motion on the same circular track. The second limit piece is fastened to a second mounting ear of the second linkage ring-piece and is located on both sides of the second linkage ring-piece mounting hole. The second limit piece is configured to limit the second eccentric wheel in the second linkage ring-piece mounting hole. An eccentric direction of the first eccentric wheel and an eccentric direction of the second eccentric wheel have an included angle there-between.

Preferably, the included angle between the eccentric direction of the first eccentric wheel and the eccentric direction of the second eccentric wheel is 0 degrees. The eccentric distance of the first eccentric wheel and the eccentric distance of the second eccentric wheel are inconsistent.

Preferably, the driving device includes a gear box, a second gear assembly, a third gear assembly, a second power source, and a third power source. The gear box is disposed on the support frame and is located on one side of the discharge channel. The second gear assembly is disposed in the gear box and is configured to drive the spiral shaft to rotate. The third gear assembly is disposed in the gear box and is configured to drive the gearing device to rotate. The second power source is disposed on the side of the gear box away from the filter chamber and extends into the gear box to be assembled with the second gear assembly. The second power source is configured to drive the second gear assembly to move. The third power source is disposed on the side of the support frame away from the filter chamber and extends into the gear box to be assembled with the third gear assembly. The third power source is configured to drive the third gear assembly to move.

Preferably, the driving device is arranged on the side of the discharge channel and the side of the feed port at the same time, and outputs the same rotational speed and steering power to the gearing shaft to reduce the driving load when the equipment is enlarged.

Preferably, the solid-liquid separator includes two spiral shafts arranged in parallel, and rotation directions of the two spiral shafts are opposite to each other. The spiral shafts are configured to push materials together and scrape off the materials stuck on the spiral shafts while pushing the materials, so as to ensure the smoothness of the material pushing.

Adopting the above-mentioned technical features, the beneficial effects of the present disclosure are that:

1. The movable closed ring-piece assembly is driven by the gearing device to reciprocate with the same circular track in all directions, so that the movable closed ring-pieces have an all-round synchronous, equidistant and uniform displacement relative to the adjacent closed fixed ring-pieces. Accordingly, the filtering area is effectively increased, the filtering effect is effectively improved, and the smoothness of the filter seam is improved.

2. Two or more positions of the linkage ring-pieces of the movable closed ring-piece assembly can be provided with the gearing devices, so that the linkage ring-pieces can be uniformly stressed during movement. Accordingly, deformation and breakage caused by mutual pressing between the linkage ring-pieces and the movable closed ring-pieces can be avoided. In addition, the distance from the inner wall to the outer ring of each of the movable closed ring-pieces can be designed to be smaller, the filter path can be shortened, the filtering effect can be effectively improved, and the super-large solid-liquid separation equipment is beneficial to be produced.

3. Since the gearing shaft is fixedly assembled on the driving device and the support frame, the risk of wear and deformation is avoided, the operation stability is improved and the service life of the machine is prolonged.

4. When the filter chamber is composed of two assemblies of movable closed ring-pieces with different directions or eccentric distances of the eccentric wheels, the quantity of movable closed ring-pieces involved in filtrate diversion and material shearing is much more, the filter gap is more transparent, and the discharge channels of the filtrate are more diverse, which are beneficial to improve the filtering effect and filtering efficiency.

5. The second gear assembly is driven by the second power source arranged on one side of the gear box to drive the spiral shaft to rotate, thereby driving the material to move from the feed port to the discharge channel. Meanwhile, by setting the third power source on the gear box on the same side as the second power source to drive the third gear assembly to drive the gearing device to move, thereby driving the filter chamber to generate filter gaps for filtering. Accordingly, the rotation rate of the spiral shaft and the rate at which the movement chamber generates gaps do not interfere with each other, which further ensure the efficiency of solid-liquid separation. In addition, the gearbox is arranged on one side of the discharge channel, thereby ensuring the smoothness of the drive operation.

6. When the two ends of the filter chamber, that is, the side of the discharge channel and the side of the feed port, are arranged to output the power that enables the gearing shafts to generate the same rotational speed and steering, a super-large solid-liquid separation equipment is conducive to production.

Further, in response to the above-referenced technical inadequacies, a second object of the present disclosure is to provide a mixing tank with a pre-concentration function, which has the advantages of high filtration efficiency, good filtration effect, stable filtration effect, good pre-concentration effect, good operation stability and long service life.

In order to achieve the above object, the present disclosure provides a mixing tank, including a stirring device with a pre-concentration function. The stirring device with the pre-concentration function includes: a driving device, the filter chamber as described above, a stirring blade, and a filtrate guiding chamber. The driving device includes a driving motor, a central axis and a gear assembly assembled with the central axis. The filtrate guiding chamber is located at the bottom of the filter chamber. The filtrate guiding chamber communicates in spatial with the interior of the filter chamber, and the central axis passes through the insides of the filter chamber and the filtrate guiding chamber.

Adopting the above-mentioned technical features, the beneficial effects of the present disclosure are that: the movable closed ring-pieces of the filter chamber are set to perform a reciprocating motion of the same circular track in all directions, and at the same time of reciprocating motion, the movable closed ring-pieces are driven to have an omni-directional synchronous, equidistant and uniform displacement relative to the adjacent closed ring-pieces. Accordingly, the filtering area is effectively increased, the filtering effect is effectively improved, and the smoothness of the filter seam is improved. The mixing tank of the present disclosure has the advantages of high filtration efficiency, good filtration effect, stable filtration effect, good pre-concentration effect, good running stability and long service life.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Obviously, the drawings in the following description are only some embodiments of the present disclosure, and for those of ordinary skill in the art, other drawings can also be obtained from these drawings without any creative effort.

Figure 1:
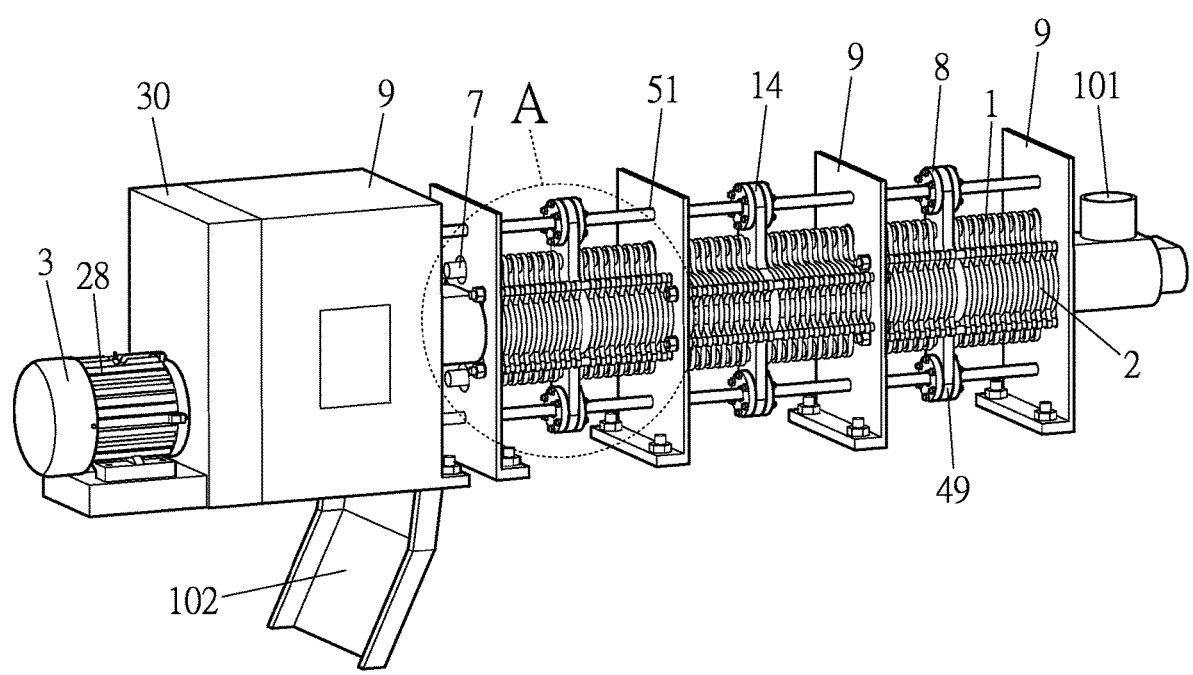
FIG. 1 is a perspective view showing a first overall structure of a reciprocating lamination spiral solid-liquid separator according to a first embodiment of the present disclosure.
Figure 2:
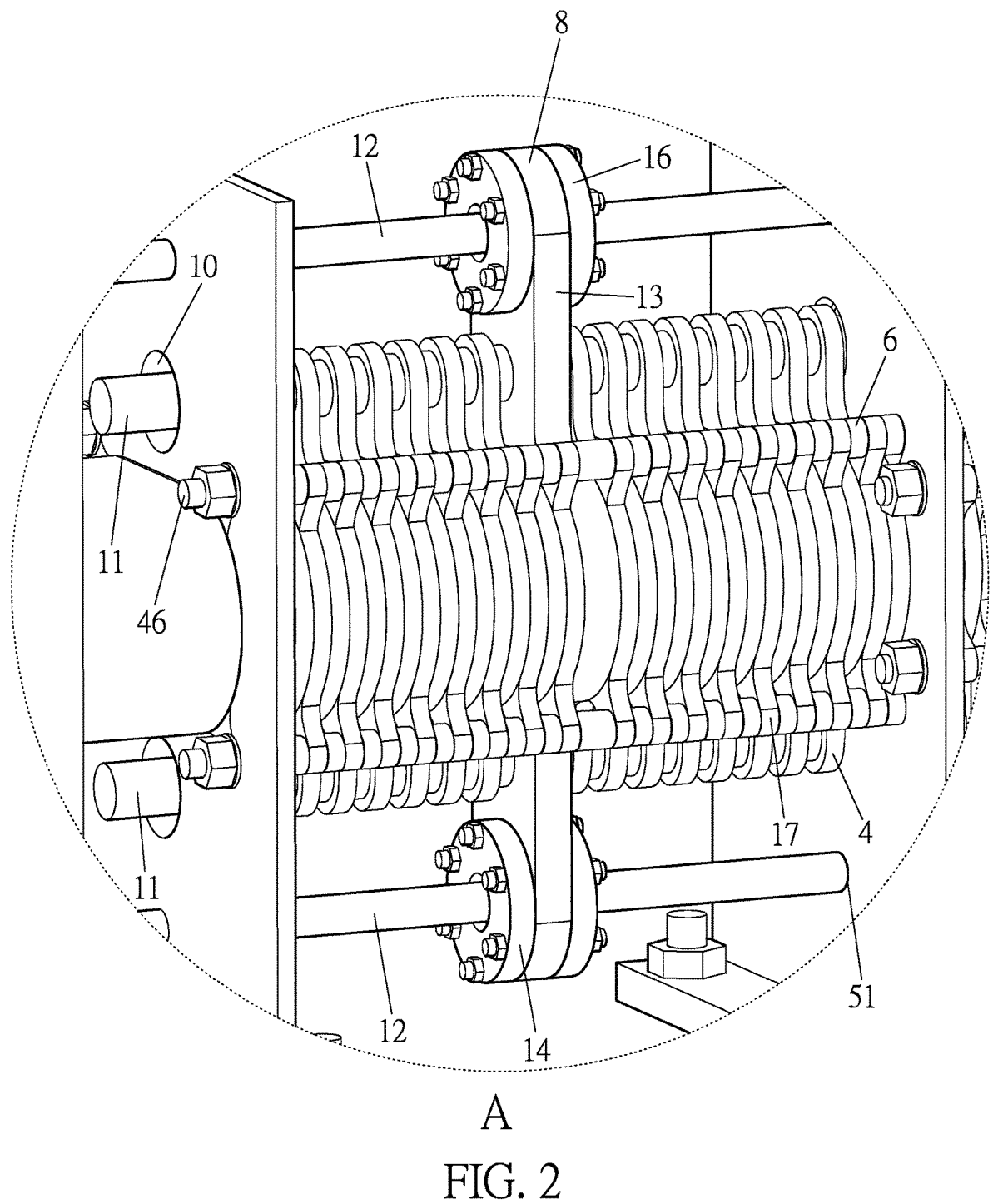
FIG. 2 is a partial enlarged view corresponding to area A in FIG. 1.

Reference numerals: 1. filter chamber; 101. feed port; 102. discharge channel; 2. spiral shaft; 3. driving device; 4. first movable closed ring-piece assembly; 5. second movable closed ring-piece assembly; 6. gasket; 7. first connection mechanism; 8. first gearing device; 9. support frame; 10. support frame escaping hole; 11. first linkage shaft; 12. first gearing shaft; 13. first linkage ring-piece; 14. first eccentric mechanism; 15. first eccentric wheel; 16. first limit piece; 17. closed fixed ring-piece assembly; 18. fixing hole; 19. second connection mechanism; 20. second gearing device; 22. second linkage shaft; 23. second gearing shaft; 24.

second linkage ring-piece; 25. second eccentric mechanism; 26. second eccentric wheel; 27. second limit piece; 28. first power source; 29. first gear assembly; 30. gear box; 32. second gear assembly; 33. third gear assembly; 34. second power source; 35. third power source; 36. filtrate guiding chamber; 37. driving motor; 38. central axis; 39. gear assembly; 40. first movable closed ring-piece through hole; 41. first linkage ring-piece through hole; 42. first linkage ring-piece mounting hole; 43. second movable closed ring-piece through hole; 44. second linkage ring-piece through hole; 45. second linkage ring-piece mounting hole; 46. fixed shaft; 47. first bearing; 48. second bearing; 49. first mounting ear; 50. second mounting ear; 51. support frame through hole

DETAILED DESCRIPTION OF THE EXEMPLARY EMBODIMENTS

The described embodiments may be better understood by reference to the following description and the accompanying drawings.

This specific embodiment is only an explanation of the present disclosure, and it is not a limitation of the present disclosure. Those skilled in the art can make modifications to this embodiment without creative contribution as needed after reading this specification, and as long as the rights of the present disclosure are used, all claims are protected by patent law.

[First Embodiment] Referring to FIG. 1 to FIG. 5, a first embodiment of the present disclosure discloses a reciprocating lamination spiral solid-liquid separator includes a support frame 9, a filter chamber 1, a spiral shaft 2 and a driving device 3. The filter chamber 1 is assembled with the support frame 9. The spiral shaft 2 is mounted on the support frame 9 and passes through the filter chamber 1. The driving device 3 is mounted on the support frame 9. Two ends of the filter chamber 1 respectively have a feed port 101 and a discharge channel 102. Preferably, the solid-liquid separator includes two spiral shafts 2 arranged in parallel, and the rotation directions of the two spiral shafts 2 are opposite to each other. The spiral shafts 2 are configured to push materials together and scrape off the materials stuck on the spiral shafts 2 while pushing the materials, so as to ensure the smoothness of the material pushing.

Referring to FIG. 1 to FIG. 5 again, the filter chamber 1 includes a first movable closed ring-piece assembly 4 and a second closed ring-piece assembly (not labeled), and a motion state of the first movable closed ring-piece assembly 4 is inconsistent with that of the second closed ring-piece assembly. The first and second closed ring-piece assemblies are stacked alternately to form the filter chamber 1. In the first and second closed ring-piece assemblies, a gasket 6 is disposed between two adjacent closed ring-pieces of a plurality of closed ring-pieces of one of the closed ring-piece assemblies, and a thickness of the gasket 6 is greater than that of any one of the closed ring-pieces of another one of the closed ring-piece assemblies, so that a filter gap is formed between the two adjacent closed ring-pieces.

Specifically, referring to FIG. 1 to FIG. 5 again, the first movable closed ring-piece assembly 4 is connected into a whole through a first connection mechanism 7 that passes through the plurality of closed ring-pieces of the first movable closed ring-piece assembly 4. The driving device 3 drives the plurality of closed ring-pieces of the first movable closed ring-piece assembly 4 through a first gearing device 8 to reciprocate the same circular track in all directions, so that a relative displacement occurs between the first movable closed ring-piece assembly 4, the support frame 9 and the adjacent second closed ring-piece assembly. Accordingly, the filter gap becomes more unobstructed and a filter area of the filter gap is increased.

Further, referring to FIG. 1 to FIG. 5 again, the first connection mechanism 7 includes at least two first linkage shafts 11. Each of the first linkage shafts 11 passes through a support frame escaping hole 10 and a first movable closed ring-piece through hole 40 of the first movable closed ring-piece assembly 4. The first linkage shafts 11 are configured to connect the first movable closed ring-piece assembly 4 into a whole and realize synchronous movement. In the present embodiment, a quantity of the first linkage shafts 11 is two. In another embodiment, a quantity of the first linkage shafts 11 is three, four, five or more.

Referring to FIG. 1 to FIG. 5 again, the first gearing device 8 includes at least two first gearing shafts 12, a first linkage ring-piece 13 and a first eccentric mechanism 14. Each of the first gearing shafts 12 passes through a support frame through hole 51 to be assembled with the driving device 3, and can move synchronously with the driving device 3. The first linkage ring piece 13 is sleeved on the at least two first gearing shafts 12 simultaneously. The first linkage ring-piece 13 is fixedly assembled with the first linkage shafts 11 and is disposed in balanced between two adjacent closed ring-pieces of the first movable closed ring-piece assembly 4. The first eccentric mechanism 14 is disposed between the first linkage ring-piece 13 and the first gearing shaft 12. The first eccentric mechanism 14 is configured to drive all the movable ring-pieces of the first movable closed ring-piece assembly 4 to generate a reciprocating motion of a same circular track.

Preferably, the first linkage ring-piece 13 has a first linkage ring-piece through hole 41. The first linkage shaft 11 passes through the first movable closed ring-piece through hole 40 and the first linkage ring-piece through hole 41.

Specifically, referring to FIG. 1 to FIG. 5 again, the first eccentric mechanism 14 includes a first eccentric wheel 15 and a first limit piece 16. The first eccentric wheel 15 is fixedly mounted on the first gearing shaft 12 and is located in the first linkage ring-piece mounting hole 42. The first eccentric wheel 15 is in contact with an inner wall of the first linkage ring-piece mounting hole 42 through a first bearing 47. When the first gearing shaft 12 rotates, the first eccentric wheel 15 drives the first linkage ring-piece 13 to generate a reciprocating motion of the same circular track. The first limit piece 16 is fastened to a first mounting ear 49 of the first linkage ring-piece 13 and is located on both sides of the first linkage ring-piece mounting hole 42. The first limit piece 16 is configured to limit the first eccentric wheel 15 in the first linkage ring-piece mounting hole 42.

In the present embodiment, the second closed ring-piece assembly is a closed fixed ring-piece assembly 17 in a static state of motion. Each of fixed ring-pieces of the closed fixed ring-piece assembly 17 has two or more fixing holes 18. Two or more fixed shafts 46 respectively pass through the two or more fixing holes 18. The fixed shafts 46 are used for fixing the closed fixed ring-piece assembly 17 on the support frame 9.

In another embodiment, referring to FIG. 5 to FIG. 13, the second closed ring-piece assembly is a second movable closed ring-piece assembly 5. The second movable closed ring-piece assembly 5 is connected into a whole by a second connection mechanism 19 that passes through the closed ring-pieces of the second movable closed ring-piece assembly 5. The driving device 3 drives the movable closed ring-pieces of the second movable closed ring-piece assembly 5 through a second gearing device 20 to perform a reciprocating motion of the same circular track in all directions, so that a relative displacement occurs between the second movable closed ring-piece assembly 5, the support frame 9 and the adjacent first movable closed ring-piece assembly 4. Accordingly, the filter gap becomes more unobstructed and a filter area of the filter gap is increased.

Referring to FIG. 5 to FIG. 13 again, the second connection mechanism 19 includes at least two second linkage shafts 22. Each of the second linkage shafts 22 passes through a support frame escaping hole 10 and a second movable closed ring-piece through hole 43 of the second movable closed ring-piece assembly 5. The at least two second linkage shafts 22 are configured to connect the second movable closed ring-piece assembly 5 into a whole and realize a synchronous movement.

Specifically, as shown in FIG. 5 to FIG. 13 again, the second gearing device 20 includes at least two second gearing shafts 23, a second linkage ring-piece 24, and a second eccentric mechanism 25.

The second gearing shafts 23 are assembled with the driving device 3 through the support frame through hole 51 and can move synchronously with the driving device 3. The second linkage ring-piece 24 is sleeved on the second gearing shafts 23. The second linkage ring-piece 24 is fixedly assembled with the second linkage shaft 22 and is disposed in balanced between two adjacent second movable closed ring-pieces of the second movable closed ring-piece assembly 5. The second eccentric mechanism 25 is disposed between the second linkage ring-piece 24 and the second gearing shaft 23. The second eccentric mechanism 25 is configured to drive all the movable ring-pieces of the second movable closed ring-piece assembly 5 to generate a reciprocating motion of the same circular track.

Preferably, the second gearing shaft 23 can be shared with the first gearing shaft 12. The second linkage ring-piece 24 has a second linkage ring-piece through hole 44. The second linkage shaft 22 passes through the second movable closed ring-piece through hole 43 and the second linkage ring-piece through hole 44.

As shown in FIG. 5 to FIG. 13 again, the second eccentric mechanism 25 includes: a second eccentric wheel 26 and a second limit piece 27. The second eccentric wheel 26 is fixedly mounted on the second gearing shaft 23 and is located in the second linkage ring-piece mounting hole 45. The second eccentric wheel 26 is in contact with an inner wall of the second linkage ring-piece mounting hole 45 through a second bearing 48. When the second gearing shaft 23 rotates, the second eccentric wheel 26 drives the second linkage ring-piece 24 to generate a reciprocating motion on the same circular track. The second limit piece 27 is fastened to a second mounting ear 50 of the second linkage ring-piece 24 and is located on both sides of the second linkage ring-piece mounting hole 45. The second limit piece 27 is configured to limit the second eccentric wheel 26 in the second linkage ring-piece mounting hole 45.

It should be noted that the solid-liquid separator of the present embodiment also includes the first eccentric mechanism 14, and an eccentric direction of the first eccentric wheel 15 and an eccentric direction of the second eccentric wheel 26 have an included angle there-between. Alternatively, the included angle between the eccentric directions of the first eccentric wheel 15 and the second eccentric wheel 26 is 0 degrees, but the eccentric distances of the first eccentric wheel 15 and the second eccentric wheel 26 are inconsistent.

Figure 3:
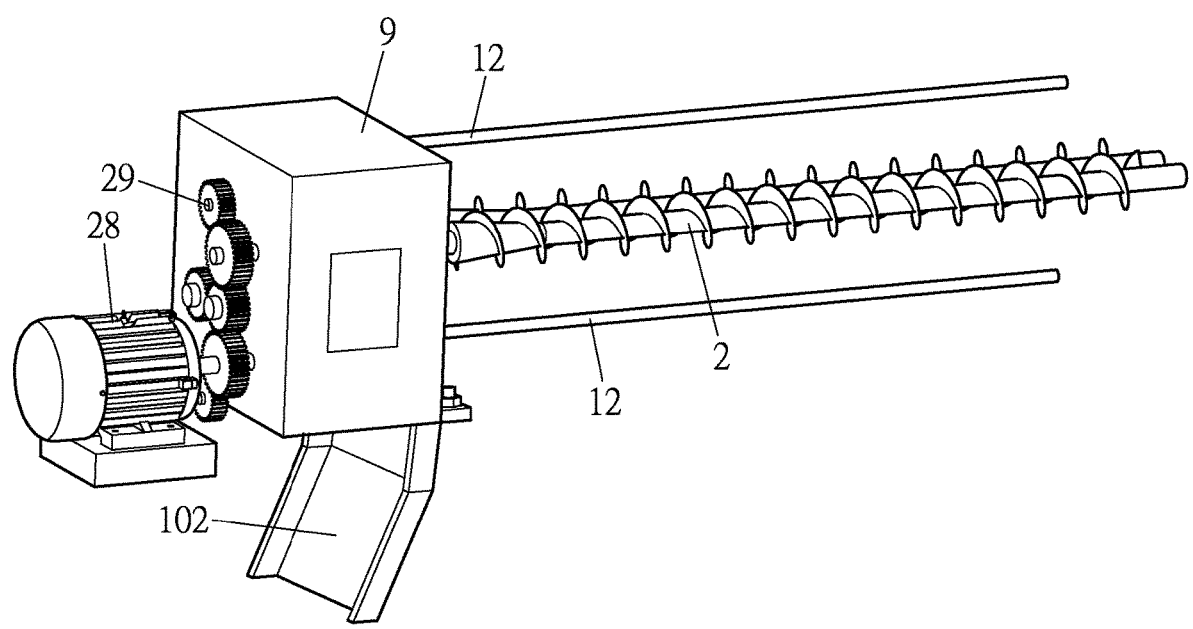
FIG. 3 is a schematic structural diagram corresponding to a support frame, a first power source, a first gear assembly, a first gearing shaft and a spiral shaft in FIG. 1.
Figure 4:
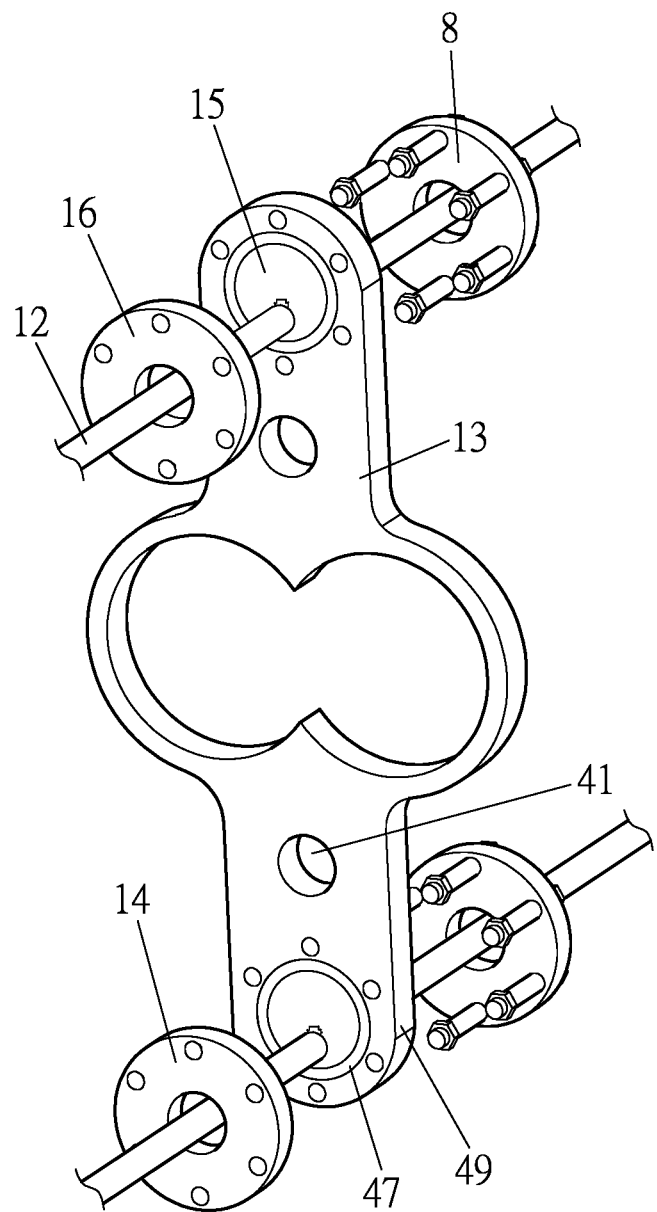
FIG. 4 is an exploded view corresponding to the first gearing device in FIG. 1.
Figure 5:
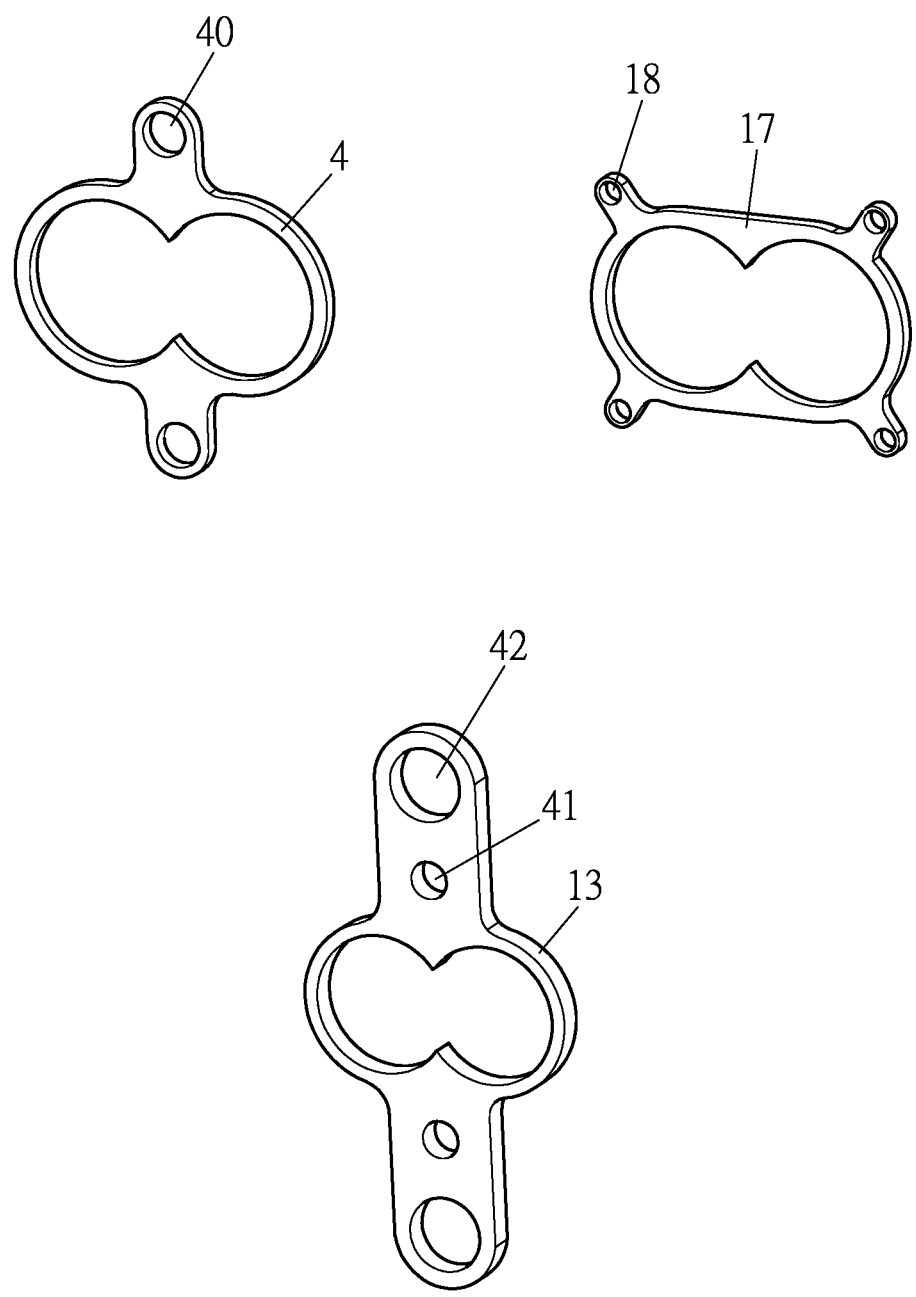
FIG. 5 is a schematic structural diagram corresponding to a first movable closed ring-piece, a first closed fixed ring-piece and a first linkage ring-piece in FIG. 1.
Figure 6:
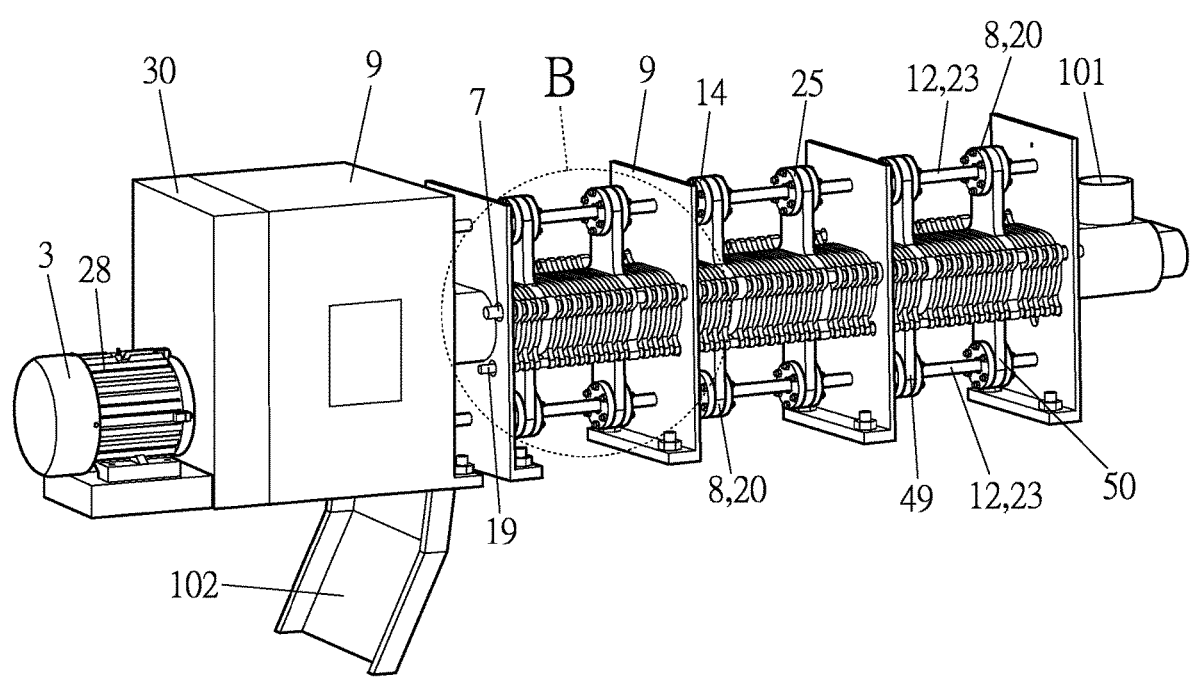
FIG. 6 is a perspective view showing a second overall structure of the reciprocating lamination spiral solid-liquid separator according to the first embodiment of the present disclosure.
Figure 7:
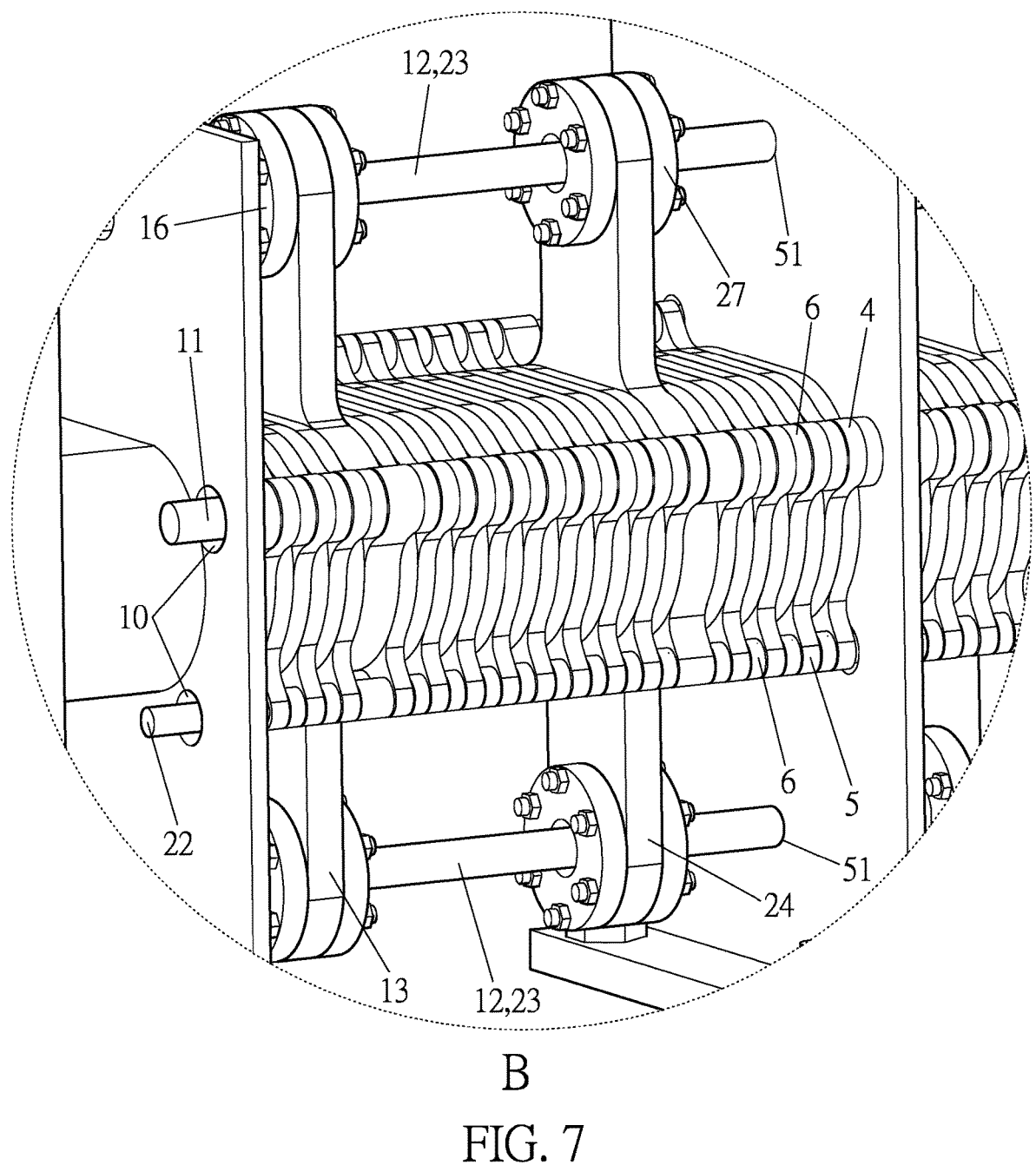
FIG. 7 is a partial enlarged view corresponding to area B in FIG. 6.
Figure 8:
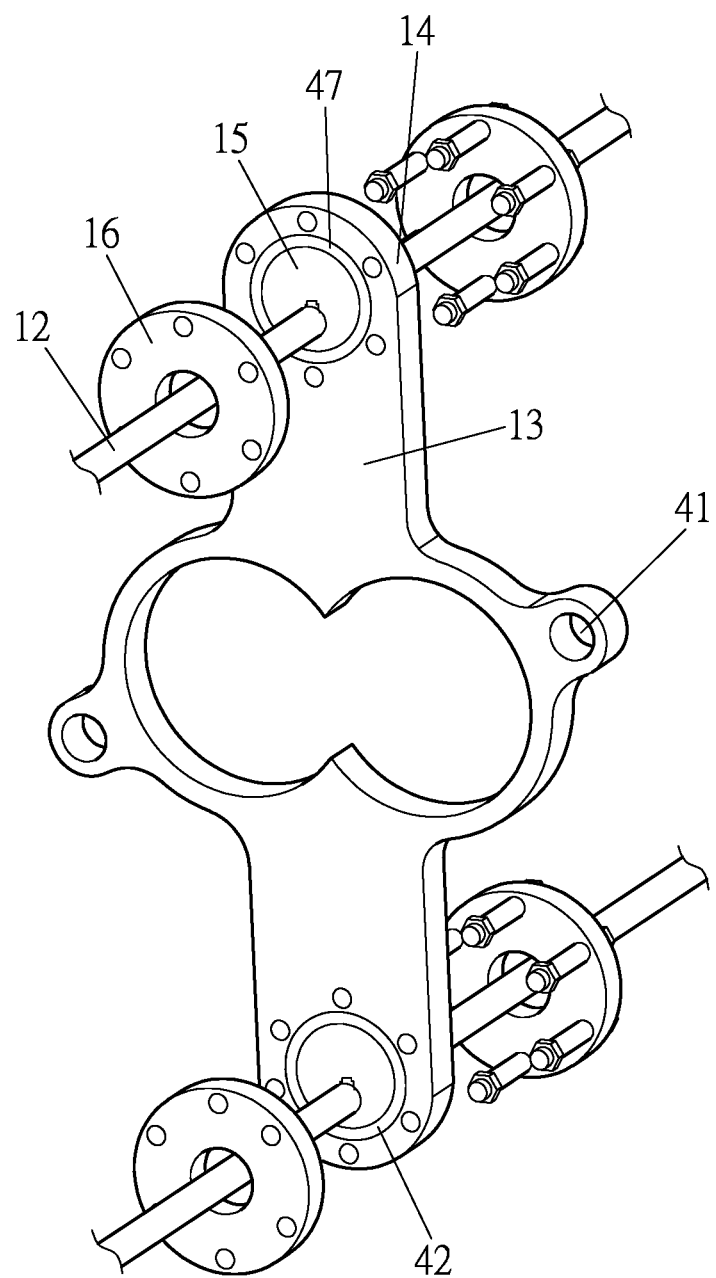
FIG. 8 is an exploded view corresponding to the first gearing device in FIG. 6.
Figure 9:
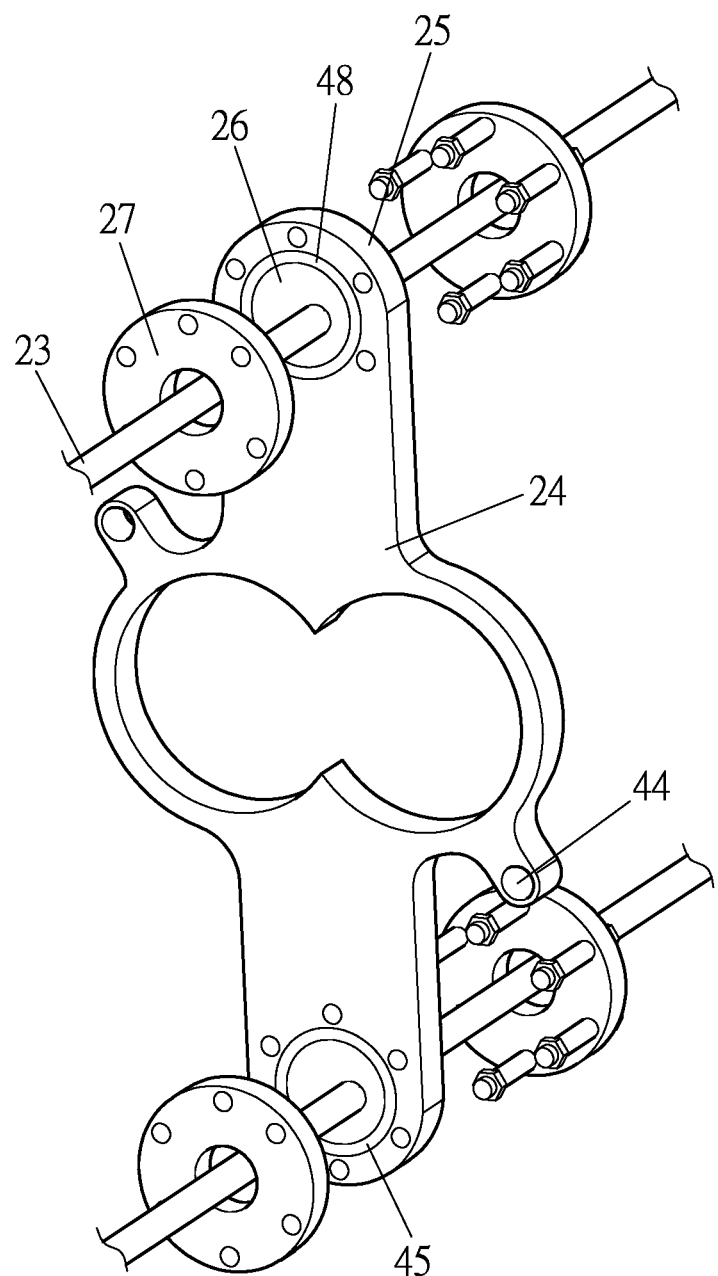
FIG. 9 is an exploded view corresponding to the second gearing device in FIG. 6.
Figure 10:
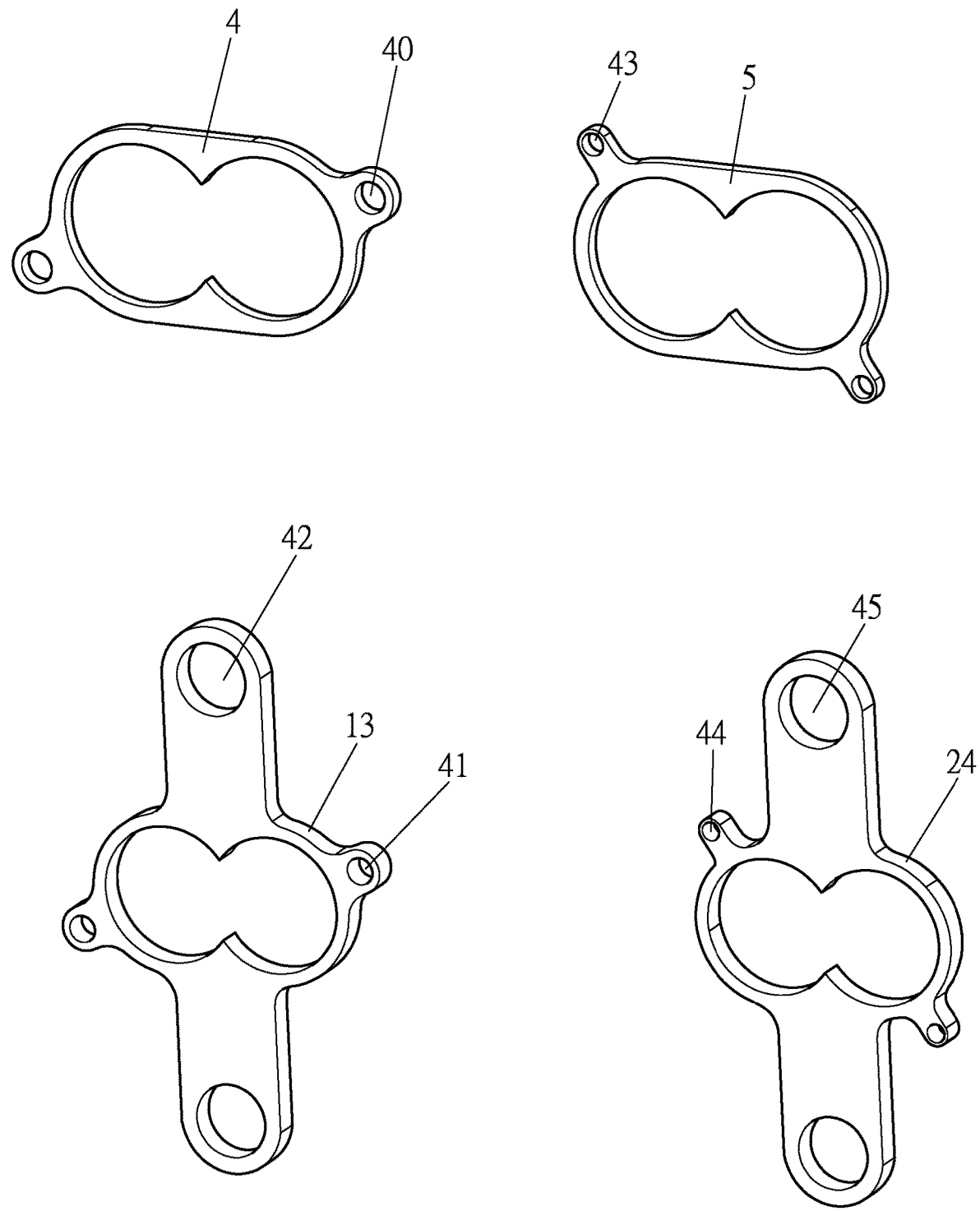
FIG. 10 is a schematic structural diagram corresponding to a first movable closed ring-piece, a second movable closed ring-piece, a first linkage ring-piece and a second linkage ring-piece in FIG. 6.
Figure 11:
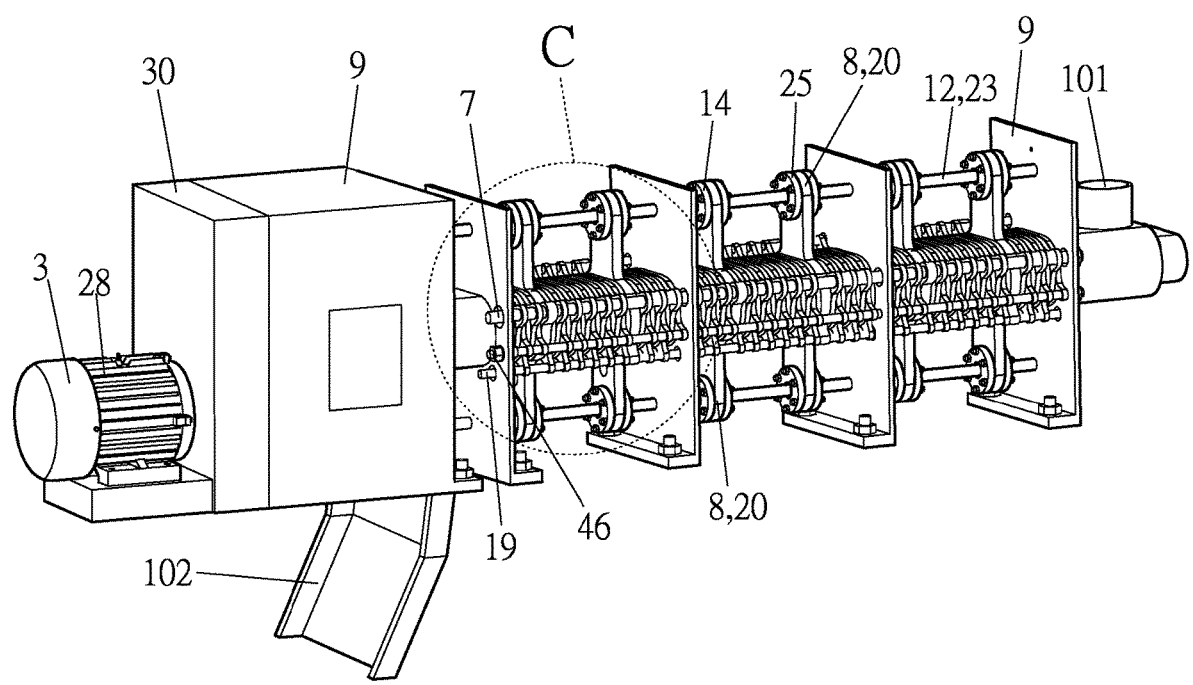
FIG. 11 is a perspective view showing a third overall structure of the reciprocating lamination spiral solid-liquid separator according to the first embodiment of the present disclosure.
Figure 12:
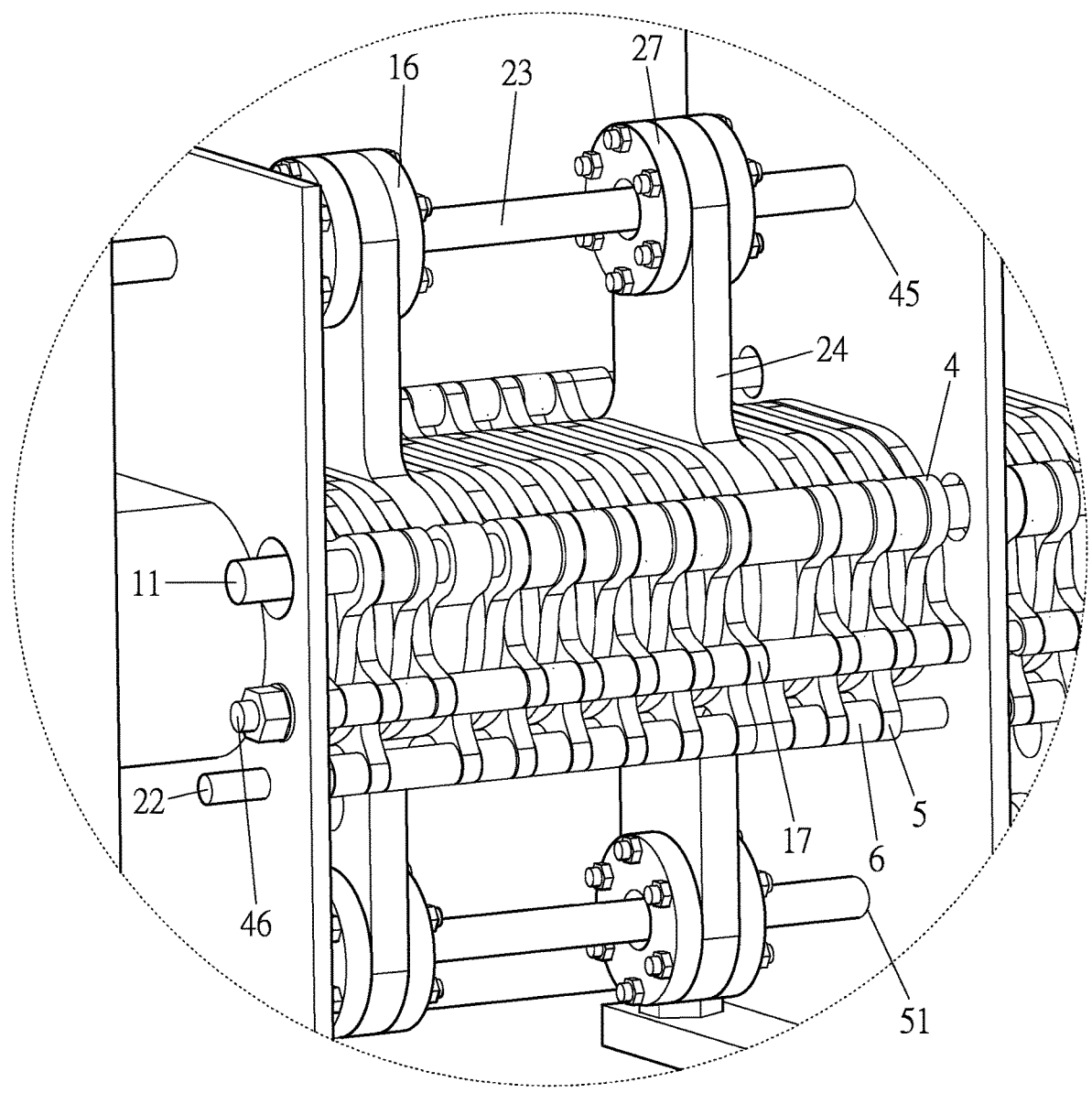
FIG. 12 is a partial enlarged view corresponding to area C in FIG. 11.
Figure 13:
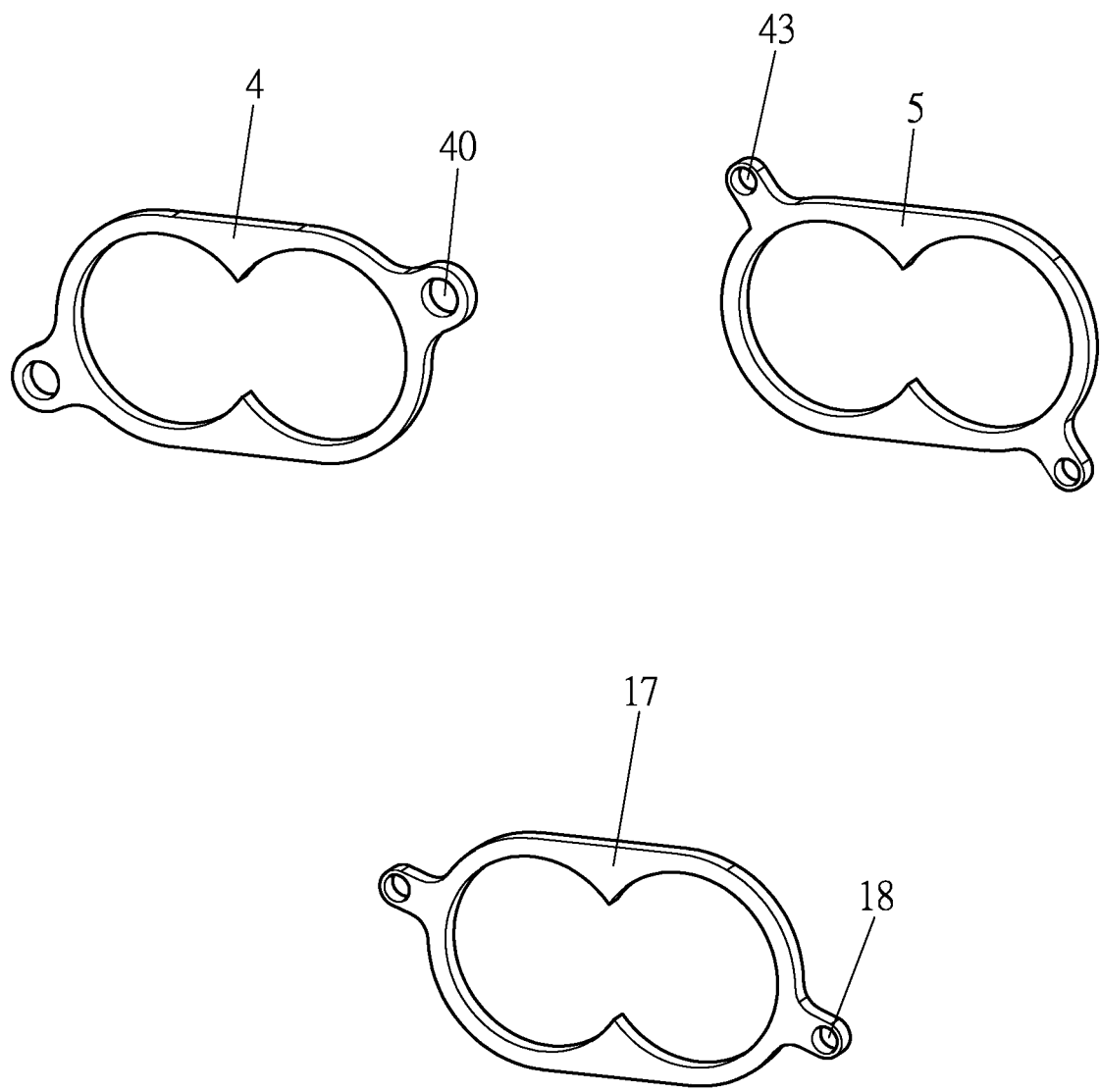
FIG. 13 is a schematic structural diagram corresponding to a first movable closed ring-piece, a second movable closed ring-piece, and a first closed fixed ring-piece in FIG. 11.

As shown in FIG. 1 and FIG. 3, the driving device 3 includes: a first power source 28, a first gear assembly 29 and a gear box 30. The gear box 30 is disposed on the support frame 9 and is located on one side of the discharge channel 102. The first gear assembly 29 is disposed in the gear box 30. Driven by the first power source 28, the first gear assembly 29 drives the first gearing shaft 12 and the first linkage shaft 11 to move through the meshing transmission between the gears, thereby driving the first eccentric mechanism 14 to move. Preferably, the first gear assembly 29 has six gears that mesh with each other, so that the rotation speeds of the spiral shafts 2 in the filter chamber 1 are consistent and the rotation directions of the spiral shafts 2 are opposite to each other. The rotation speed of the first gearing shaft 12 drives the movement of the first movable closed ring-piece assembly 4 to be consistent with the direction of rotation.

Figure 14:
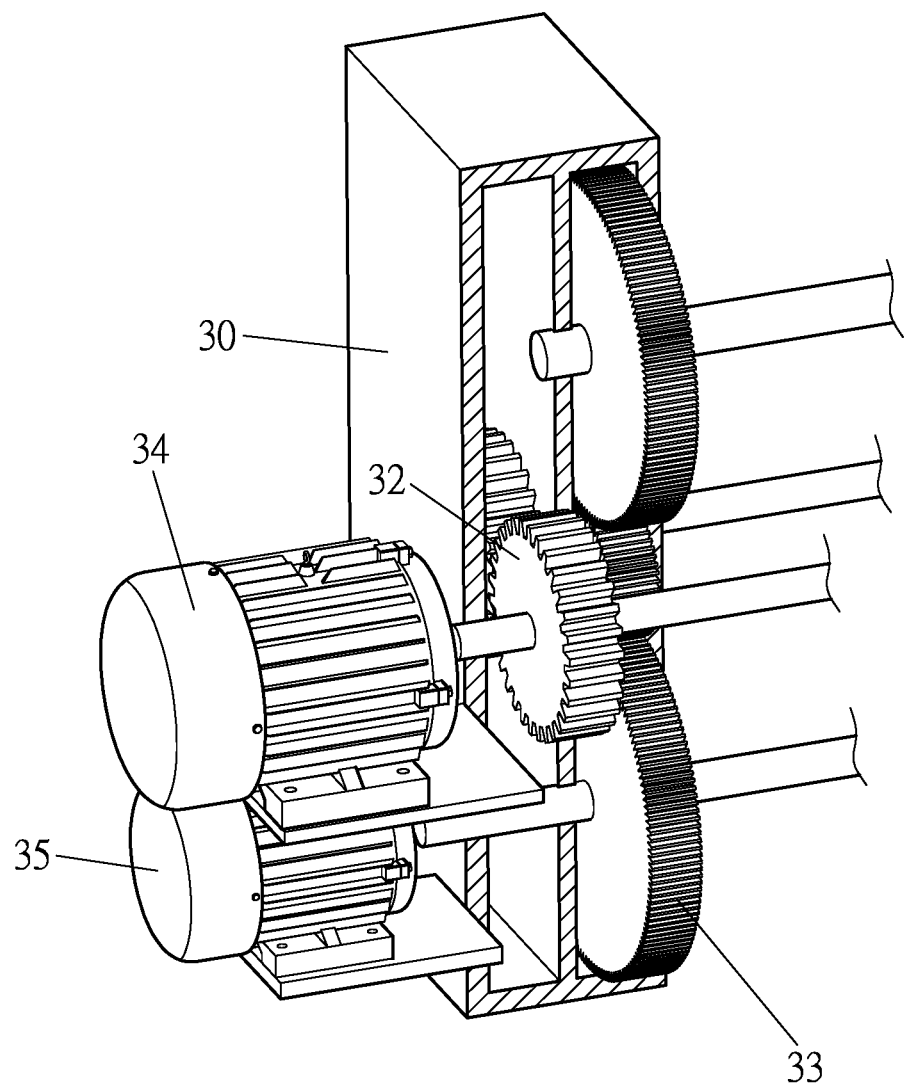
FIG. 14 is a schematic structural diagram corresponding to a gear box, a second gear assembly, a third gear assembly, a second power source, and a third power source according to the first embodiment of the present disclosure.
Figure 15:
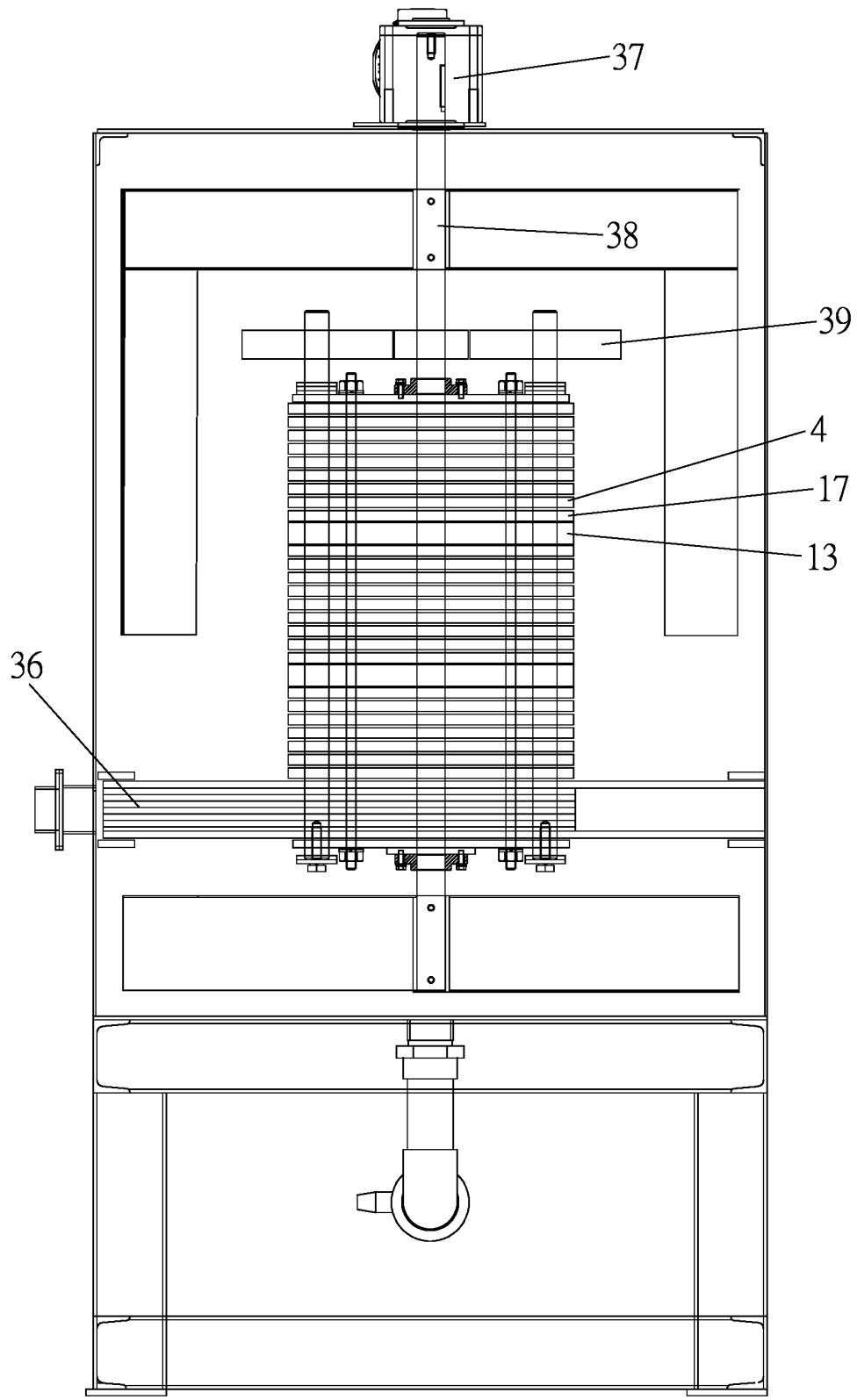
FIG. 15 is a perspective view showing an overall structure of a mixing tank with a pre-concentration function according to a second embodiment of the present disclosure.
Figure 16:
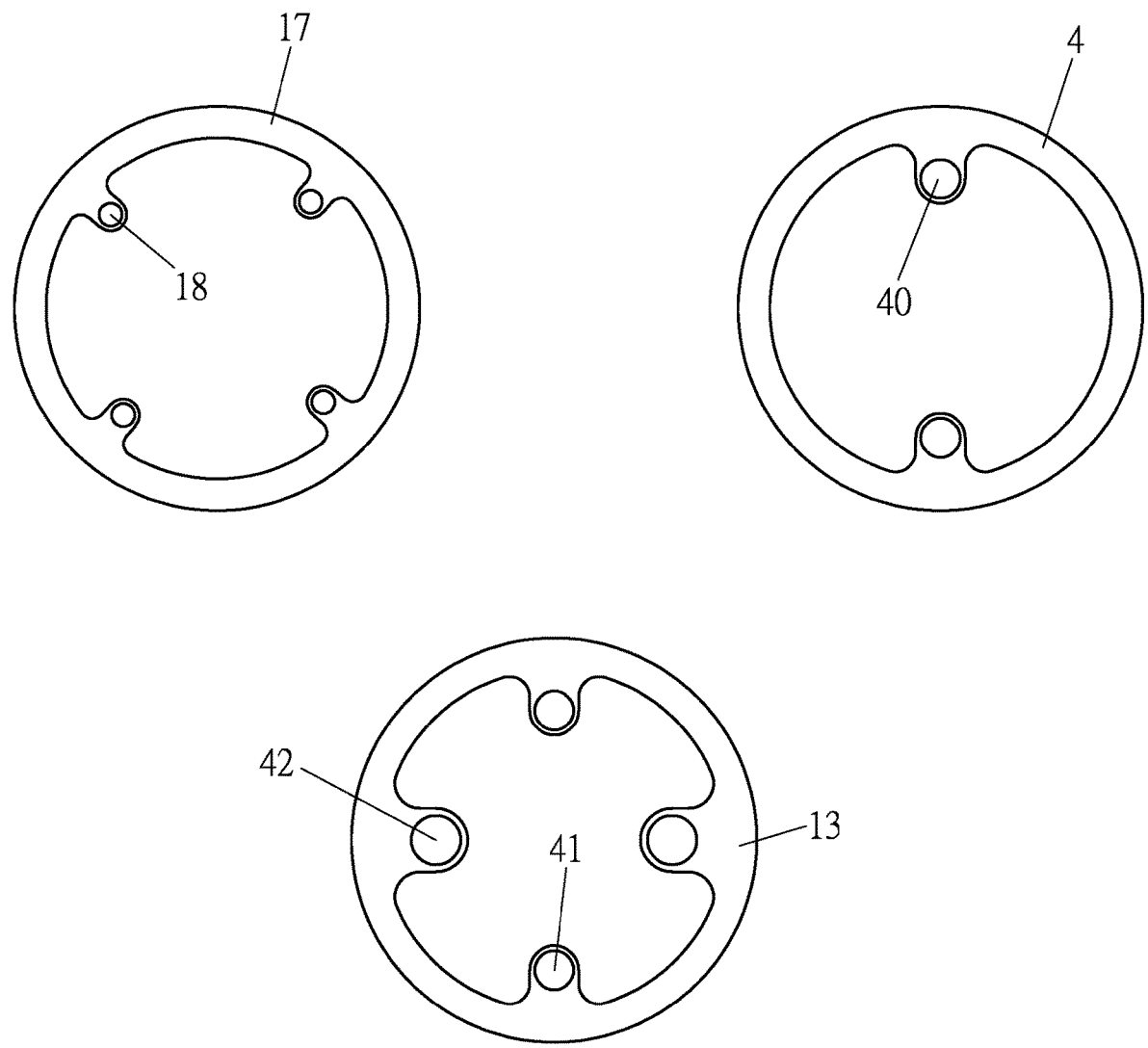
FIG. 16 is a schematic structural diagram corresponding to a first movable closed ring-piece, a first closed fixed ring-piece, and a first linkage ring-piece according to the second embodiment of the present disclosure.

In another embodiment, as shown in FIG. 14, the driving device 3 includes a gear box 30, a second gear assembly 32, a third gear assembly 33, a second power source 34 and a third power source 35.

The gear box 30 is disposed on the support frame 9 and is located on one side of the discharge channel 102. The second gear assembly 32 is disposed in the gear box 30. The second gear assembly 32 is used for driving the spiral shafts 2 to generate movements with the same rotational speeds and opposite rotational directions. The third gear assembly 33 is disposed in the gear box 30. The third gear assembly 33 is configured to drive the first gearing device 8 to rotate, so that the first movable closed ring-piece assembly 4 produces the movements with the same rotational speeds and rotational directions. The second power source 34 is disposed on a side of the gear box 30 away from the filter chamber 1 and extends into the gear box 30 to be assembled with the second gear assembly 32. The second power source 34 is configured to drive the second gear assembly 32 to move. The third power source 35 is disposed on the side of the support frame 9 away from the filter chamber 1 and extends into the gear box 30 to be assembled with the third gear assembly 33. The third power source 35 is configured to drive the third gear assembly 33 to move.

Alternatively, the driving device 3 is arranged on the side of the discharge channel 102 and the side of the feed port 101 at the same time, and outputs the same rotational speed and steering power to the gearing shaft to reduce the driving load when the equipment is enlarged.

It should be noted that the working flow of the solid-liquid separator is as follows. Flocculated material enters the filter chamber through the feed port of the reciprocating lamination spiral solid-liquid separator. The material is continuously pushed forward by the two spiral shafts in the filter chamber with opposite directions. Even if the material is easy to entangle and harden, the material will move forward smoothly because of the mutual scraping between the two spiral shafts. In the process of material being conveyed, the filter chamber is displaced with the adjacent closed ring due to the reciprocating motion of the movable closed ring-pieces, so that the filter seam is kept unobstructed. The filtrate can be discharged from the inside of the filter chamber through the filter slit and collected into the filtrate collection tank in the conventional art. The dehydrated material is finally discharged from the discharge channel.

[Second Embodiment] The second embodiment is based on the first embodiment. The second embodiment provides a mixing tank with pre-concentration function. The mixing tank is equipped with a stirring device with the pre-concentration function. The stirring device with the pre-concentration function includes: a driving device 3, the above-mentioned filter chamber 1, a stirring blade, and a filtrate guiding chamber 36. The driving device includes a driving motor 37, a central axis 38 and a gear assembly 39 assembled with the central axis 38. The filtrate guiding chamber 36 is located at the bottom of the filter chamber 1. The filtrate guiding chamber 36 communicates with the interior of the filter chamber 1. The central axis 38 passes through the inside of the filter chamber 1 and the filtrate guiding chamber 36.

It should be noted that the workflow of the mixing tank with the pre-concentration function is as follows. In the mixing tank with the pre-concentration, the flocculated material is arranged in the filter chamber above the mixing tank. Due to the reciprocating motion of the movable closed ring-pieces, the filter chamber is displaced with the adjacent closed ring-pieces to keep the filter seam unobstructed. The filtrate can be discharged inward from the outside of the filter chamber through the filter slit, and can be discharged through the filtrate guiding chamber communicated with the filter chamber. The concentration of the material left in the mixing tank becomes higher, so as to achieve the effect of pre-concentration.

The above is only used to illustrate the technical solution of the present disclosure and not to limit it. Other modifications or equivalent replacements made by those of ordinary skill in the art to the technical solution of the present disclosure, as long as they do not depart from the spirit and scope of the technical solution of the present invention, should be included in the within the scope of the claims of the present disclosure.

What is claimed is:

1. A reciprocating lamination spiral solid-liquid separator, comprising:
 a support frame, a filter chamber, a spiral shaft and a driving device;
  wherein the filter chamber is assembled with the support frame, the spiral shaft is mounted on the support frame and passes through the filter chamber, the driving device is mounted on the support frame, and two ends of the filter chamber respectively have a feed port and a discharge channel;
  wherein the filter chamber includes a first movable closed ring-piece assembly and a second closed ring-piece assembly having a motion state different from a motion state of the first movable closed ring-piece assembly; wherein the first movable closed ring-piece assembly and the second closed ring-piece assembly are stacked alternately to form the filter chamber; wherein a gasket is disposed between two adjacent closed ring-pieces of a plurality of closed ring-pieces of at least one of the first movable closed ring-piece assembly and the second closed ring-piece assembly, and a thickness of the gasket is greater than a thickness of the closed ring-piece of another one of the first movable closed ring-piece assembly and the second closed ring-piece assembly, so that a filter gap is formed between the two adjacent closed ring-pieces;
 wherein the first movable closed ring-piece assembly is connected to form an integrated structure through a first connection mechanism that passes through the plurality of closed ring-pieces of the first movable closed ring-piece assembly, the driving device drives the plurality of closed ring-pieces of the first movable closed ring-piece assembly through a first gearing device to reciprocate along a same circular track, so that the first movable closed ring-piece assembly, the support frame and the adjacent second closed ring-piece assembly are displaced relative to each other, and the filter gap becomes unobstructed and a filter area of the filter gap is increased,
 wherein the first connection mechanism includes at least two first linkage shafts, each of the first linkage shafts passes through a support frame escaping hole and a first movable closed ring-piece through hole of the first movable closed ring-piece assembly, and the at least two first linkage shafts are configured to connect the first movable closed ring-piece assembly and realize a synchronous movement; wherein the first gearing device includes at least two first gearing shafts, a first linkage ring-piece and a first eccentric mechanism; wherein each of the first gearing shafts is assembled with the driving device and is capable of moving synchronously with the driving device; the first linkage ring piece is sleeved on the first gearing shafts and is disposed between two adjacent movable closed ring-pieces of the first movable closed ring-piece assembly; wherein the first eccentric mechanism is disposed between the first linkage ring-piece and the first gearing shaft, and the first eccentric mechanism is configured to drive all the closed movable ring-pieces of the first movable closed ring-piece assembly to generate a reciprocating motion along the same circular track; wherein the first linkage ring-piece has a first linkage ring-piece through hole, and the first linkage shaft passes through the first movable closed ring-piece through hole and the first linkage ring-piece through hole,
 wherein the second closed ring-piece assembly is a second movable closed ring-piece assembly, and the second movable closed ring-piece assembly is connected by a second connection mechanism that passes through the closed ring-pieces of the second movable closed ring-piece assembly; wherein the driving device drives the closed ring-pieces of the second movable closed ring-piece assembly through a second gearing device to perform a reciprocating motion along the same circular track, so that the second movable closed ring-piece assembly, the support frame and the adjacent first movable closed ring-piece assembly are displaced relative to each other, and the filter gap becomes more unobstructed and the filter area of the filter gap is increased; wherein the second connection mechanism includes at least two second linkage shafts, each of the second linkage shafts passes through a support frame escaping hole and a second movable closed ring-piece through hole, and the at least two second linkage shafts are configured to connect the second movable closed ring-piece assembly to form an integrated structure and realize a synchronous movement; wherein the second gearing device includes at least two second gearing shafts, a second linkage ring-piece, and a second eccentric mechanism; wherein the second gearing shafts are assembled with the driving device and capable of moving synchronously with the driving device, the second linkage ring-piece is sleeved on the second gearing shafts and is disposed between two adjacent second closed ring-pieces of the second movable closed ring-piece assembly, the second eccentric mechanism is disposed between the second linkage ring-piece and the second gearing shaft, and the second eccentric mechanism is configured to drive all the closed ring-pieces of the second movable closed ring-piece assembly to generate a reciprocating motion along the same circular track; wherein the second gearing shaft is capable of being shared with the first gearing shaft, the second linkage ring-piece has a second linkage ring-piece through hole, and the second linkage shaft passes through the second movable closed ring-piece through hole and the second linkage ring-piece through hole; wherein the second eccentric mechanism includes: a second eccentric wheel and a second limit piece; wherein the second eccentric wheel is fixedly mounted on the second gearing shaft and is located in the second linkage ring-piece mounting hole, the second eccentric wheel is in contact with an inner wall of the second linkage ring-piece mounting hole through a second bearing; wherein, when the second gearing shaft rotates, the second eccentric wheel (26) drives the second linkage ring-piece to generate a reciprocating motion along the same circular track; wherein the second limit piece is fastened to a second mounting ear of the second linkage ring-piece and is located on both sides of the second linkage ring-piece mounting hole; wherein the second limit piece is configured to limit the second eccentric wheel in the second linkage ring-piece mounting hole; wherein the first eccentric mechanism includes a first eccentric wheel; wherein an eccentric direction of the first eccentric wheel and an eccentric direction of the second eccentric wheel have an included angle therebetween, wherein the included angle between the eccentric direction of the first eccentric wheel and the eccentric direction of the second eccentric wheel is 0 degrees, and an eccentric distance of the first eccentric wheel and an eccentric distance of the second eccentric wheel are different.

2. The reciprocating lamination spiral solid-liquid separator according to claim 1, wherein the first eccentric mechanism includes a first limit piece, the first eccentric wheel is fixedly mounted on the first gearing shaft and is located in the first linkage ring-piece mounting hole, and the first eccentric wheel is in contact with an inner wall of the first linkage ring-piece mounting hole through a first bearing; wherein, when the first gearing shaft rotates, the first eccentric wheel drives the first linkage ring-piece to generate a reciprocating motion along the same circular track; wherein the first limit piece is fastened to a first mounting ear of the first linkage ring-piece and is located on both sides of the first linkage ring-piece mounting hole, and the first limit piece is configured to limit the first eccentric wheel in the first linkage ring-piece mounting hole.

3. The reciprocating lamination spiral solid-liquid separator according to claim 1, wherein each of a plurality of fixed ring-pieces of the closed fixed ring-piece assembly has two or more fixing holes, and two or more fixed shafts respectively pass through the two or more fixing holes and are used for fixing the plurality of fixed ring-pieces of the closed fixed ring-piece assembly on the support frame.

4. The reciprocating lamination spiral solid-liquid separator according to claim 1, wherein the driving device includes a gear box, a first gear assembly, a second gear assembly, a first power source, and a second power source; wherein the gear box is disposed on the support frame and is located on one side of the discharge channel, the first gear assembly is disposed in the gear box and is configured to drive the spiral shaft to rotate, the second gear assembly is disposed in the gear box and is configured to drive the first gearing device to rotate, the first power source is disposed on a side of the gear box away from the filter chamber and extends into the gear box to be assembled with the first gear assembly, the first power source is configured to drive the first gear assembly to move, the second power source is disposed on a side of the support frame away from the filter chamber and extends into the gear box to be assembled with the second gear assembly, and the second power source is configured to drive the second gear assembly to move.

5. The reciprocating lamination spiral solid-liquid separator according to claim 1, wherein the driving device is arranged on each of one side close to the discharge channel and another side close to the feed port, and the driving device outputs a same rotational speed and steering power to the at least two first gearing shafts or the at least two second gearing shafts to reduce the driving load when an equipment is enlarged.

6. The reciprocating lamination spiral solid-liquid separator according to claim 1, wherein the reciprocating lamination solid-liquid separator includes two spiral shafts arranged in parallel, and rotation directions of the two spiral shafts are opposite to each other; wherein the spiral shafts are configured to push materials together and scrape off the materials stuck on the spiral shafts while pushing the materials together, so as to ensure the smoothness of a process of pushing the material together.

7. The reciprocating lamination spiral solid-liquid separator according to claim 2, wherein the driving device includes a gear box, a first gear assembly, a second gear assembly, a first power source, and a second power source; wherein the gear box is disposed on the support frame and is located on one side of the discharge channel, the first gear assembly is disposed in the gear box and is configured to drive the spiral shaft to rotate, the second gear assembly is disposed in the gear box and is configured to drive the gearing device to rotate, the first power source is disposed on a side of the gear box away from the filter chamber and extends into the gear box to be assembled with the first gear assembly, the first power source is configured to drive the first gear assembly to move, the second power source is disposed on a side of the support frame away from the filter chamber and extends into the gear box to be assembled with the second gear assembly, and the second power source is configured to drive the second gear assembly to move.

8. The reciprocating lamination spiral solid-liquid separator according to claim 3, wherein the driving device includes a gear box, a first gear assembly, a second gear assembly, a first power source, and a second power source; wherein the gear box is disposed on the support frame and is located on one side of the discharge channel, the first gear assembly is disposed in the gear box and is configured to drive the spiral shaft to rotate, the second gear assembly is disposed in the gear box and is configured to drive the gearing device to rotate, the first power source is disposed on a side of the gear box away from the filter chamber and extends into the gear box to be assembled with the first gear assembly, the first power source is configured to drive the first gear assembly to move, the second power source is disposed on a side of the support frame away from the filter chamber and extends into the gear box to be assembled with the second gear assembly, and the second power source is configured to drive the second gear assembly to move.

9. The reciprocating lamination spiral solid-liquid separator according to claim 2, wherein the driving device is arranged on each of one side close to the discharge channel and another side close to the feed port, and the driving device outputs a same rotational speed and steering power to the gearing shaft to reduce the driving load when an equipment is enlarged.

10. The reciprocating lamination spiral solid-liquid separator according to claim 3, wherein the driving device is arranged on each of one side close to the discharge channel and another side close to the feed port, and the driving device outputs a same rotational speed and steering power to the gearing shaft to reduce the driving load when an equipment is enlarged.

* * * * *